US009823035B2

(12) United States Patent
Geissele et al.

(10) Patent No.: US 9,823,035 B2
(45) Date of Patent: Nov. 21, 2017

(54) MOUNT FOR FIREARM ASSEMBLY AND ADJUSTMENT

(71) Applicant: WHG Properties, LLC, North Wales, PA (US)

(72) Inventors: William H. Geissele, Lower Gwynedd, PA (US); Joseph Plunkett, Jr., Clifton Heights, PA (US)

(73) Assignee: WHG Properties, LLC, North Wales, PA (US)

( * ) Notice: Subject to any disclaimer, the term of this patent is extended or adjusted under 35 U.S.C. 154(b) by 0 days.

(21) Appl. No.: 14/715,148

(22) Filed: May 18, 2015

(65) Prior Publication Data
US 2016/0202014 A1   Jul. 14, 2016

Related U.S. Application Data

(63) Continuation-in-part of application No. 29/514,132, filed on Jan. 8, 2015, now Pat. No. Des. 762,278.

(51) Int. Cl.
| | |
|---|---|
| *B25B 1/10* | (2006.01) |
| *B25B 1/20* | (2006.01) |
| *B25B 1/24* | (2006.01) |
| *B25B 5/14* | (2006.01) |
| *B25B 27/00* | (2006.01) |
| *B23Q 3/02* | (2006.01) |
| *B23Q 3/06* | (2006.01) |
| *F41A 23/16* | (2006.01) |
| *F41A 23/18* | (2006.01) |
| *B23B 5/14* | (2006.01) |
| *B23B 1/00* | (2006.01) |

(52) U.S. Cl.
CPC ............... *F41A 23/18* (2013.01); *B23B 1/00* (2013.01); *B23B 5/14* (2013.01); *B23Q 3/02* (2013.01); *B23Q 3/062* (2013.01); *F41A 23/16* (2013.01)

(58) Field of Classification Search
CPC .. F41C 23/00; F21C 3/16; F41A 23/18; F41A 23/16
USPC ............... 269/257, 287, 288, 909, 309, 902; 42/71.01, 75.01, 75.03
See application file for complete search history.

(56) References Cited

U.S. PATENT DOCUMENTS

| | | | | |
|---|---|---|---|---|
| 356,871 | A | * | 2/1887 | Forbes ................... B25B 1/103 269/242 |
| 2,645,855 | A | * | 7/1953 | Ivy ........................ F41G 11/001 42/126 |
| 2,890,848 | A | * | 6/1959 | Johnson, Jr. ......... B23Q 3/1546 248/206.5 |
| 3,128,073 | A | * | 4/1964 | Berlyn ................... B29C 47/08 248/55 |
| 3,245,678 | A | * | 4/1966 | Riehle ................... B23Q 3/103 269/257 |
| 3,358,504 | A | * | 12/1967 | Freebairn ............... F41A 23/16 73/167 |

(Continued)

OTHER PUBLICATIONS http://www.botach.com/kley-zion-ar15-m4-receiver-extension-buffer-tube-buddy-armorers-tool/ retrieved May 18, 2015.

*Primary Examiner* — Joseph J Hail
*Assistant Examiner* — J Stephn Taylor
(74) *Attorney, Agent, or Firm* — Merchant & Gould, P.C.

(57) ABSTRACT

A mount for firearm assembly and adjustment includes a firearm engagement portion having a hollow body with at least one recess for receiving a firearm buffer tube therein, and a support member configured to be secured to a support.

20 Claims, 5 Drawing Sheets

(56) References Cited

U.S. PATENT DOCUMENTS

| | | | |
|---|---|---|---|
| 4,007,554 A | 2/1977 | Helmstadter | |
| 4,266,748 A | 5/1981 | Dalton | |
| 4,445,678 A * | 5/1984 | George | B23Q 3/104 269/282 |
| 4,621,821 A * | 11/1986 | Schneider | B23H 7/26 219/69.11 |
| 4,667,548 A * | 5/1987 | Astle | B23B 5/165 269/152 |
| 4,750,841 A * | 6/1988 | Hicks | B29C 47/08 248/901 |
| 5,033,219 A * | 7/1991 | Johnson | F41G 11/003 362/289 |
| D406,036 S | 2/1999 | Erwin et al. | |
| 6,254,077 B1 * | 7/2001 | Riley, Jr. | B25B 5/10 269/156 |
| 6,425,561 B2 * | 7/2002 | Wooten | F41G 1/35 248/229.1 |
| D506,521 S | 6/2005 | Strahan | |
| 7,356,960 B1 | 4/2008 | Knitt | |
| 7,793,452 B1 * | 9/2010 | Samson | F41C 23/16 42/71.01 |
| 8,146,282 B2 * | 4/2012 | Cabahug | F41C 23/22 42/71.01 |
| 8,714,536 B2 * | 5/2014 | Stadtfeld | B23F 23/06 269/287 |
| D762,278 S | 7/2016 | Geissele | |
| 2009/0026679 A1 | 1/2009 | Harman | |
| 2009/0205238 A1 | 8/2009 | Willis | |
| 2013/0264761 A1 * | 10/2013 | Dagenais | B23K 37/0217 269/287 |
| 2014/0130390 A1 * | 5/2014 | Geissele | F41C 23/16 42/71.01 |
| 2014/0189999 A1 * | 7/2014 | Koczera | B23Q 3/06 29/559 |

* cited by examiner

MOUNT FOR FIREARM ASSEMBLY AND ADJUSTMENT

CROSS-REFERENCE TO RELATED APPLICATIONS

This application is a continuation-in-part of U.S. patent application Ser. No. 29/514,132 filed Jan. 8, 2015 (now U.S. Pat. No. D762,278), titled FIREARM MOUNT, the disclosure of which is hereby incorporated by reference in its entirety.

BACKGROUND

A problem associated with firearm maintenance and assembly is the difficulty of steadying the firearm in an orientation suited to the maintenance or assembly being performed. Firearms often contain small components in hard-to-reach places. Removing, installing, adjusting, fixing, or otherwise manipulating such components can present a challenge because of the components' size and location within the firearm. The task can be simplified if the firearm is arranged in the right position and orientation, but getting and keeping the firearm there can be challenging.

SUMMARY

In general terms, this application relates to a firearm mount. In some embodiments the firearm mount is configured to secure a firearm in a desired position and orientation during assembly or adjustment. In some embodiments the mount is configured to be secured in another support mechanism, such as a vise.

One aspect is a mount for firearm assembly and adjustment comprising a firearm engagement portion comprising a hollow body defining a central, longitudinal axis and comprising at least one recess extending away from the longitudinal axis, the at least one recess forming a buffer tube flange receiving portion that provides a mounting setting for a firearm buffer tube; and a support member extending from the firearm engagement portion and configured to be secured to a support.

Another aspect is a mount for firearm assembly and adjustment comprising a firearm engagement portion comprising a hollow body defining a central, longitudinal axis and comprising a plurality of recesses such that each of the plurality of recesses extends in a distinct direction away from the longitudinal axis; and a support member extending from the firearm engagement portion and configured to be secured to a support.

A further aspect is a mount for firearm assembly and adjustment comprising a firearm engagement portion comprising a hollow body comprising an outer surface, an inner surface, and at least one through-hole for inserting a fastener therethrough, the hollow body defined by a central, longitudinal axis and comprising four recesses such that each of the four recesses extends in a distinct direction away from the central, longitudinal axis and provides a distinct mounting setting for a firearm buffer tube, wherein adjacent recesses of the four recesses are perpendicular to each other; and a support member, the support member comprising a plurality of support engaging surfaces extending from the bottom of the firearm engagement portion and configured to be secured in a vise.

DETAILED DESCRIPTION

Various embodiments are described herein in detail with reference to the drawings, wherein like reference numerals represent like parts and assemblies throughout the several views. Reference to various embodiments does not limit the scope of the appended claims. Additionally, any examples set forth in this specification are not intended to be limiting and merely set forth some of the many possible embodiments for the appended claims.

Figure 1:
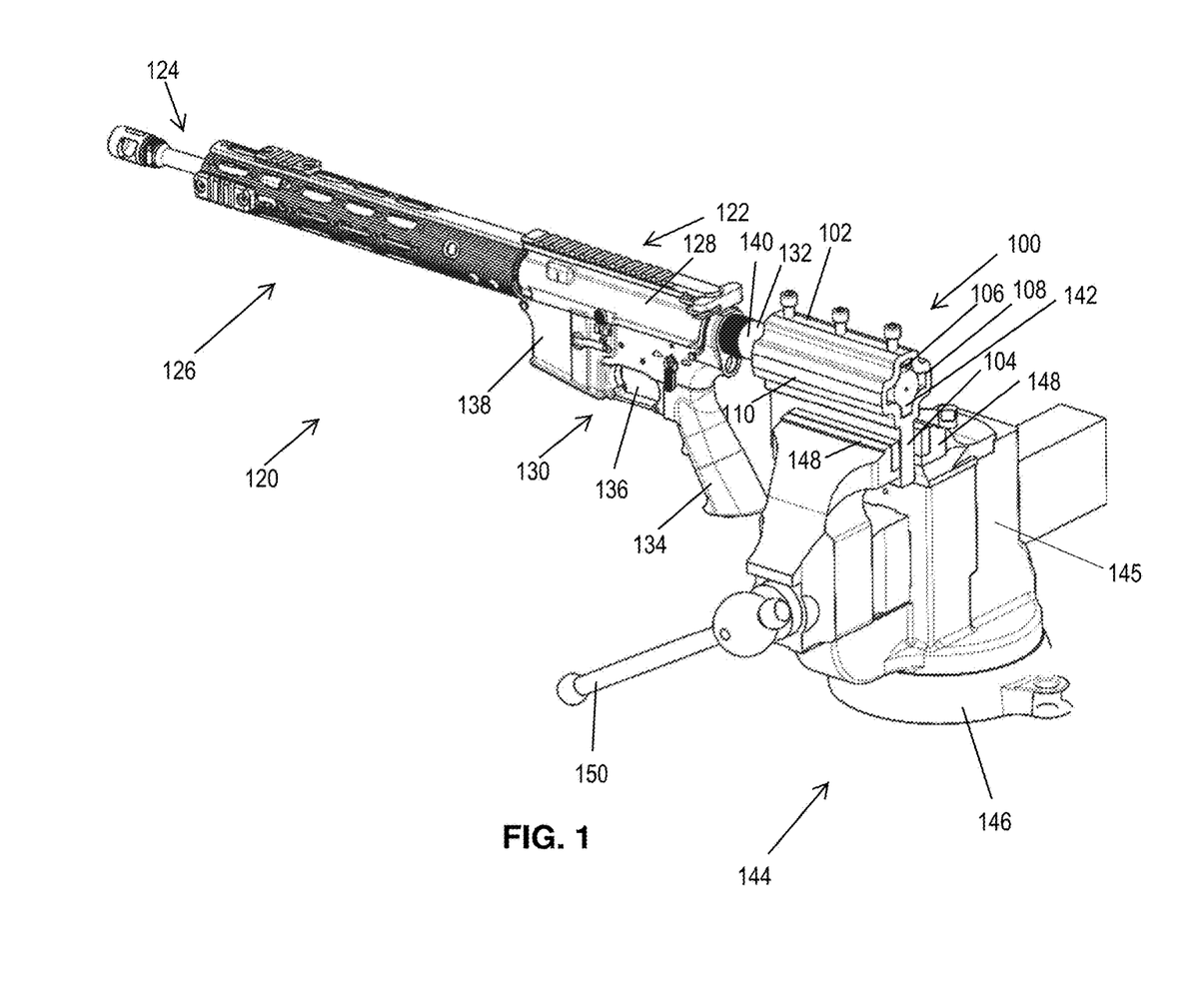
FIG. 1 illustrates a firearm assembly and adjustment mount in accordance with the present disclosure in use with a firearm and a support mechanism.

FIG. 1 illustrates an example of a firearm assembly and adjustment mount 100 in use with a firearm 120 and a support mechanism 144. The firearm assembly and adjustment mount 100 generally includes a firearm engagement portion 102 and a support member 104 extending from the firearm engagement portion 102. The firearm engagement portion 102 of the firearm assembly and adjustment mount 100 includes a hollow body 106 including an inner surface 108 and an outer surface 110.

The firearm engagement portion 102 is configured to receive and engage with a portion of a firearm for the purpose of supporting the firearm 120 in a desired position and orientation. In this example the firearm engagement portion 102 includes a hollow body 106 having an inner surface 108 and an outer surface 110. An interior space is formed between the inner surface 108 into which a portion of the firearm 120 is received and secured. The inner surface 108 and the outer surface 110 are discussed in further detail herein.

The support member 104 is connected to and extends from the firearm engagement portion 102, and has outer surfaces that are sized and shaped to be secured to a support. In this example, the outer surfaces are sized and shaped to be securely held by the support mechanism 144, such as, for example, a vise or a clamp. In one possible configuration, the support member 104 is a rectangular protrusion that is suitably long, wide and thick to be secured in the jaws of a vise. An example of the support member 104 is discussed in further detail below in connection with FIGS. 4-5.

As discussed above, the firearm assembly and adjustment mount 100 operates to support a firearm 120 in a desired position and orientation. An example of a firearm 120 is illustrated in FIG. 1. In this example, the firearm 120 includes a receiver assembly 122, a barrel assembly 124, and a handguard assembly 126.

The firearm 120 is a gun configured to discharge a projectile. Several examples of the firearm 120 include a handgun, a rifle, a shotgun, a musket, a carbine, a machine gun, a submachine gun, an air gun, and a paintball gun. More specific examples of firearms 120 that can be secured using the firearm assembly and adjustment mount 100 include an AR-15, M-16, or M-4 type rifle, or one of their variants.

The receiver assembly 122 is a part of the firearm that houses the operating parts, such as the firing mechanism and associated components. In some embodiments the receiver assembly 122 includes a spring-biased hammer that is cocked and then released by a sear upon actuating a trigger mechanism. The hammer strikes a firing pin carried by a bolt, which in turn is thrust forward to contact and discharge a cartridge loaded in a chamber. A portion of the expanding combustion gases traveling down the barrel is discharged off and used to drive the bolt rearward against a forward biasing force of a recoil spring for automatically ejecting the spent cartridge casing and automatically loading a new cartridge into the chamber from a magazine when the bolt returns forward. In at least one embodiment, the receiver assembly 122 includes an upper receiver 128 and a lower receiver 130.

The upper receiver 128 defines an internal longitudinally-extending cavity configured to receive a bolt assembly. The bolt assembly is slidably disposed in the cavity for axially reciprocating recoil movement therein. In at least one embodiment, the upper receiver 128 is an AR-15, M-16 or M-4 type upper receiver, or one of their variants.

The lower receiver 130 includes a buffer tube 132, a handgrip 134, a trigger mechanism 136, and a magazine well 138. The buffer tube 132 is situated behind the firing chamber and reduces the recoil of the firearm caused by the motion of the firing bolt assembly during firing. Such a buffer tube is typically mounted to the receiver of the firearm. In this example buffer tube 132 includes a cylindrical portion 140, and a flange 142. In some embodiments the buffer tube 132 also includes a buffer pin, a buffer spring for recoil reduction, as well as a castle nut and an endplate. In at least one embodiment, the lower receiver 130 is an AR-15, M-16 or M-4 type lower receiver, or one of their variants.

As also discussed above, the firearm assembly and adjustment mount 100 is configured in at least some embodiments to be held by a support mechanism 144. FIG. 1 shows one example of the support mechanism 144, in the form of a vise 145. The vise 145 generally includes a base 146, jaws 148, and a crank 150. The base 146 is typically secured to a work surface during operation of the vise 145. In this example, the jaws 148 hold the support member 104 of the example firearm assembly and adjustment mount 100. The crank 150 is used to rotate a screw that moves the jaws 148 closer together or farther apart, thereby allowing the vise 145 to alternatively secure or release the firearm assembly and adjustment mount 100.

Figure 2:
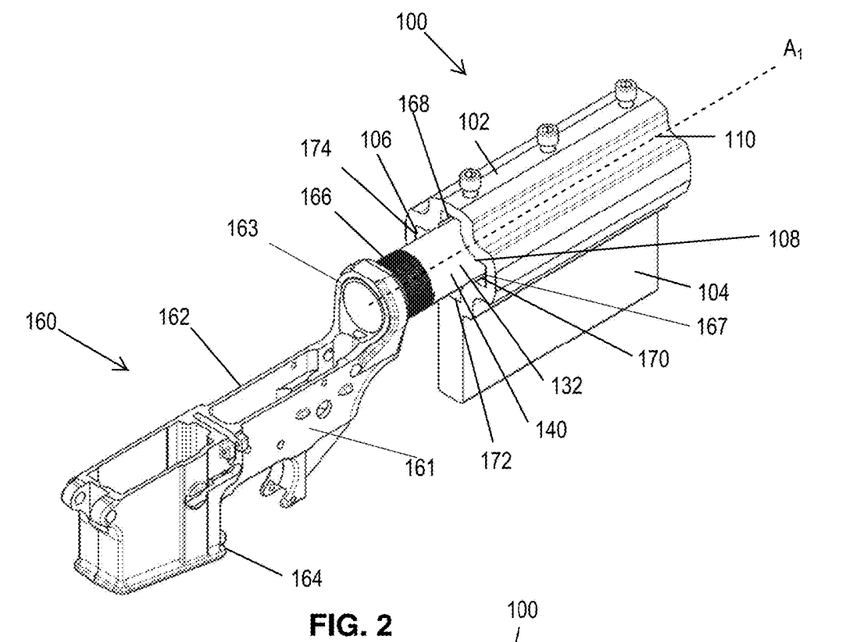
FIG. 2 is a perspective view a firearm assembly and adjustment mount in accordance with the present disclosure housing a partially assembled lower receiver portion of a firearm in a first orientation.

FIG. 2 is a perspective view of an example of the firearm assembly and adjustment mount 100. In this example the firearm assembly and adjustment mount 100 is shown housing a partially assembled lower receiver portion 160 of the firearm 120 (shown in FIG. 1) in a first orientation. As discussed above, the example firearm assembly and adjustment mount 100 includes a firearm engagement portion 102, a support member 104, a hollow body 106, an inner surface 108, and an outer surface 110. Additionally, in this example the partially assembled lower receiver portion 160 includes the buffer tube 132 with its cylindrical portion 140 as discussed above, and a rear portion 161. In this example, the rear portion 161 of the lower receiver portion 160 includes an upper portion 162, a threaded portion 163, and a lower portion 164. In this example the buffer tube 132 includes screw threads 166. Also in this example, the hollow body 106 includes multiple recesses 167, such as recesses 168, 170, 172, and 174.

In this example of the lower receiver portion 160, the screw threads 166 screw into a corresponding threaded portion 163 of the rear portion 161 of the lower receiver portion 160 to secure the buffer tube 132 to the rear portion 161.

In some embodiments the hollow body 106 includes multiple recesses 167. In some embodiments the hollow body 106 includes one or more recesses, such as in a range from about 1 to about 8 recesses. In this specific example the hollow body 106 includes four recesses 168, 170, 172 and 174, which are evenly spaced from one another and project radially in different directions away from a central longitudinal axis $A_1$ extending through the center of the hollow body 106 of the example firearm assembly and adjustment mount 100. The recesses 167 are shaped and configured to receive the flange 142 (FIG. 1) of a firearm buffer tube. The recesses 167 are arranged at different positions, and allow the buffer tube 132 and flange 142 to be inserted into the hollow body at discrete orientations. In the example having four recesses 167, the buffer tube 132 and flange 142 can be inserted into the hollow body in four different orientations (in this example: upright, left side up, right side up, or upside down). Therefore, the recesses 167 provide multiple discrete mounting positions of the firearm 120 (or portion of the firearm 120) when it is mounted in the firearm assembly and adjustment mount 100. In the example shown in FIG. 2, the flange 142 (not visible in FIG. 2, but shown in FIG. 1) of the buffer tube 132 is received by recess 172. The shape of the recess 172 prevents the flange 142 from rotating about axis $A_1$ of buffer tube 132 within the hollow body 106, and thereby prevents rotation of the firearm 120 about axis $A_1$ while it is being worked on.

Mounting partially assembled lower receiver portion 160 into the firearm assembly and adjustment mount 100 in this first orientation facilitates work (i.e., maintenance, adjustment, and/or assembly) on upper portion 162 thereof, because the upper portion 162 is facing upwards when the firearm assembly and adjustment mount 100 is secured to the support mechanism 144 in the manner shown in FIG. 1.

In this example, four recesses 168, 170, 172, and 174 corresponding to four discrete mounting positions are shown at right angles to each other, such that recesses 168 and 172 extend from axis $A_1$ anti-parallel and parallel, respectively, relative to support member 104, while recesses 170 and 174 extend in opposite directions perpendicularly from axis $A_1$ relative to support member 104. In alternative embodiments, different numbers of recesses 167 can be used such as one, two, three, five, or more. In some of these embodiments containing multiple recesses 167, the recesses 167 are evenly spaced around the inner surface 108 of the hollow body 106 of the firearm assembly and adjustment mount 100. In other embodiments, the recesses are not evenly spaced. Moreover, in some embodiments one or more of the recesses 167 extend from the central longitudinal axis of the hollow body 106 at an oblique angle relative to the support member 104.

In this example, only a partially assembled lower receiver portion 160 of the firearm 120 is shown mounted to the firearm assembly and adjustment mount 100. In alternative examples of the firearm assembly and adjustment mount 100 in use, different portions of a firearm 120 are mounted therein for maintenance and/or assembly, such as, by way of non-limiting examples, the entire lower receiver 130 (shown in FIG. 1) of a firearm, the receiver assembly 122 (also shown in FIG. 1), an entire firearm 120 (except perhaps for the buttstock, for example), or other portions or combinations of portions of the firearm 120.

Figure 3:
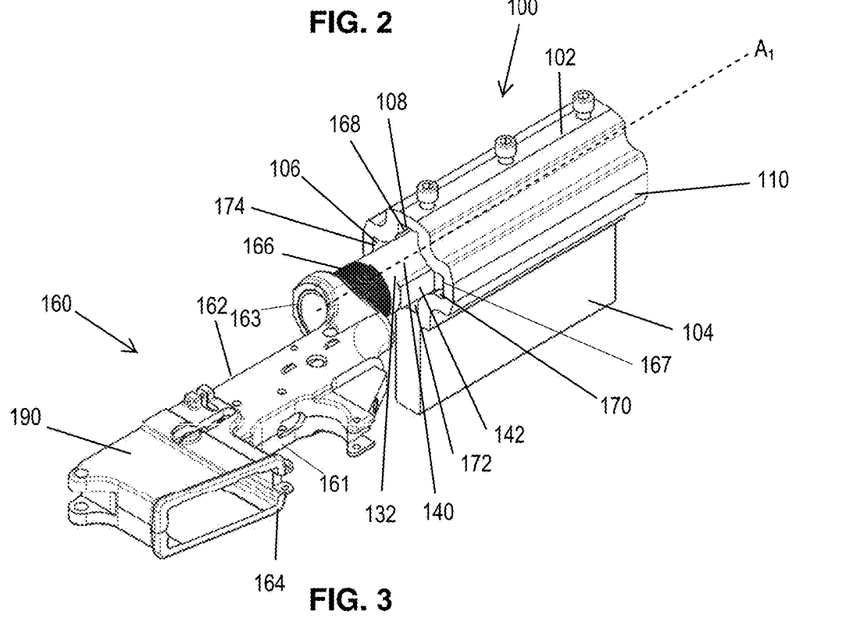
FIG. 3 is a perspective view of a firearm assembly and adjustment mount in accordance with the present disclosure housing a partially assembled lower receiver portion of a firearm in a second orientation.

FIG. 3 is another perspective view of the firearm assembly and adjustment mount 100. In this example the firearm assembly and adjustment mount 100 is shown housing the partially assembled lower receiver portion 160 of the firearm 120 (shown in FIG. 1) in a second orientation.

As discussed above, the example firearm assembly and adjustment mount 100 includes the firearm engagement portion 102, the support member 104, the hollow body 106 including the inner surface 108, the outer surface 110, and the recesses 167, such as recesses 168, 170, 172, and 174 discussed above. As further discussed above, FIG. 3 also shows the partially assembled lower receiver portion 160 of a rifle having the buffer tube 132 and the rear portion 161. The rear portion 161 of the lower receiver portion 160 includes the upper portion 162, the threaded portion 163, and the lower portion 164. As discussed above, the buffer tube 132 includes the cylindrical portion 140, the flange 142, and the screw threads 166. Additionally, in this example the partially assembled lower receiver portion 160 includes a left side portion 190.

In the example shown in FIG. 3, the flange 142 of the buffer tube 132 of the lower receiver portion 160 is received by the recess 170. The shape of the recess 170 prevents the flange 142 from rotating about axis $A_1$ within the hollow body 106, and thereby prevents the partially assembled lower receiver portion 160 from rotating while it is being worked on.

Mounting the partially assembled lower receiver portion 160 into the firearm assembly and adjustment mount 100 in this second orientation facilitates work (maintenance, adjustment, and/or assembly) on the left side portion 190 thereof, because the left side portion 190 is facing upwards when the firearm assembly and adjustment mount 100 is secured to the support mechanism 144 in the manner shown in FIG. 1.

The example firearm assembly and adjustment mount 100 similarly includes two additional recesses 168 and 174 that function similarly to recesses 170 and 172, to hold the firearm in an upside down position, or a right-side up position, respectively, when the firearm assembly and adjustment mount 100 is secured in the support mechanism 144 in the manner shown in FIG. 1.

Figure 4:
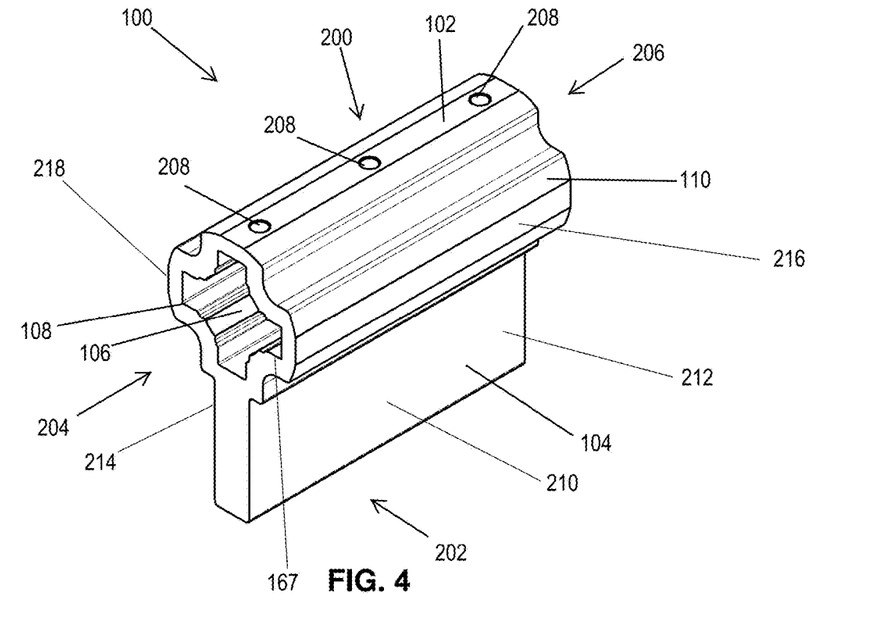
FIG. 4 is another perspective view of an example firearm assembly and adjustment mount.

FIG. 4 is another perspective view of an example firearm assembly and adjustment mount 100. As discussed above, the example firearm assembly and adjustment mount 100 includes the firearm engagement portion 102, the support member 104, and the hollow body 106 including the inner surface 108, the outer surface 110, and recesses 167. Additionally, in this example the firearm assembly and adjustment mount 100 includes a top 200, a bottom 202, a front 204, a back 206, and through-holes 208. In some embodiments the support member 104 includes one or more support engaging surfaces 210, such as a first support engaging surface 212 and a second support engaging surface 214. The hollow body 106 includes a left side 216 and a right side 218.

In some embodiments the front 204 and the back 206 of the firearm engagement portion 102 include openings through which the buffer tube 132 (FIGS. 1-3) can be inserted into the hollow body 106. In some embodiments the firearm assembly and adjustment mount 100 is symmetrical front to back, such that the front 204 and the back 206 are interchangeable. In other embodiments, one of the front 204 or the back 206 is blocked off so that the buffer tube 132 can only be inserted through one of the front 204 or the back 206.

In some embodiments the firearm assembly and adjustment mount 100 includes one or more fasteners that can be used to fasten a portion of the firearm 120 into the mount 100. In this example, the hollow body 106 includes one or more through-holes 208 that are configured to receive a fastener therein, such as support screws or pins, that cooperate to secure the portion of the firearm inside the hollow body 106. Examples of fasteners are illustrated and described in further detail with reference to FIG. 6. When the one or more fasteners are secured, the fasteners operate to secure a portion of the firearm 120 (such as the buffer tube 132) in the firearm assembly and adjustment mount 100, thereby preventing or making it more difficult for the buffer tube to slide longitudinally out of the mount 100 while the firearm 120 or portion thereof is being worked on.

In some embodiments, one or more through-holes 208 are disposed in the top 200 of firearm assembly and adjustment mount 100. In alternative embodiments, one or more through-holes 208 can extend through the outer surface 110 and inner surface 108 of hollow body 106 at any suitable location on hollow body 106. For example, through-holes 208 can be disposed in one or more locations in the top 208 of the firearm assembly and adjustment mount 100, in the left side 216 of the hollow body 106, in the right side 218 of the hollow body 106, and/or in locations therebetween in the hollow body 106.

In some embodiments the support member 104 includes one or more support engaging surfaces 210 that engage with the support mechanism 144, such as a vise 145 (FIG. 1) or a clamp, to secure the firearm assembly and adjustment mount 100 in place during operation. In this example, the support member 104 includes a first support engaging surface 212 and a second support engaging surface 214 disposed opposite the first support engaging surface 212. In this example, the first support engaging surface 212 and the second support engaging surface 214 extend from the bottom of the firearm engagement portion 102. The jaws 148 of a vise 145 (FIG. 1) grip the first support engaging surface 212 and the second support engaging surface 214 to frictionally hold the support member 104 and prevent movement of the firearm assembly and adjustment mount 100. In some embodiments, the disposition of the jaws 148 of the vise 145 (FIG. 1) can be tipped relative to a horizontal work surface, enabling correspondingly tipped positions of the firearm assembly and adjustment mount 100 relative to the horizontal work surface when the support member 104 is held by the jaws 148 of the vise 145 (FIG. 1). Additionally or alternatively, the firearm assembly and adjustment mount 100 can also be inserted into the vise 145 at an angle relative to the horizontal work surface before the mount 100 is firmly clamped into the jaws 148 to support the firearm 120 (FIG. 1) in various possible orientations.

Figure 5:
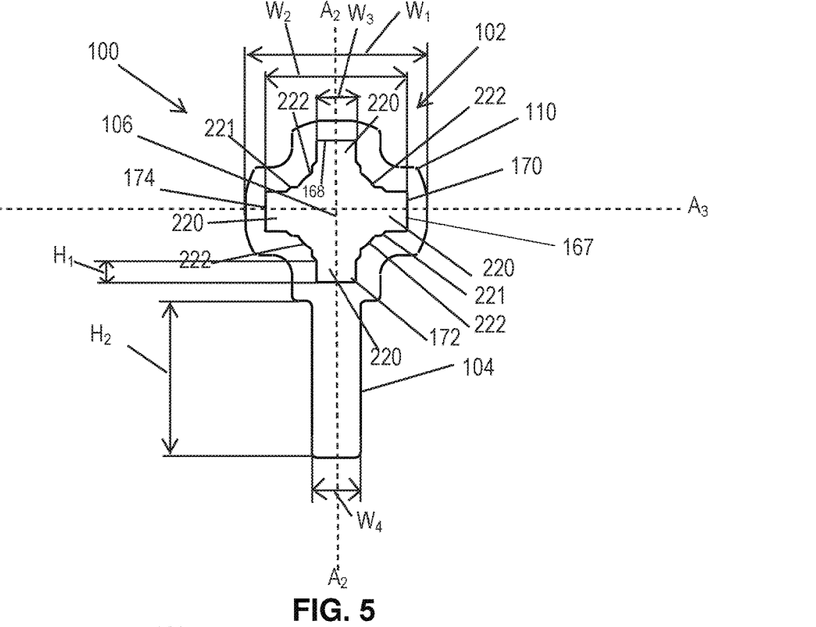
FIG. 5 is a front view of the firearm assembly and adjustment mount of FIG. 3.

FIG. 5 is a front view of an example of the firearm assembly and adjustment mount 100. In some embodiments the rear view of the mount 100 is the same as that shown in FIG. 5. As discussed above, the example firearm assembly and adjustment mount 100 includes the firearm engagement portion 102, the support member 104, and the hollow body 106 including the inner surface 108, and the outer surface 110. FIG. 5 also includes recesses 167 (including, for example, recesses 168, 170, 172, and 174) as discussed above. Additionally, in this example, the hollow body 106 further defines flange receiving portions 220 and buffer tube supports 222.

The recesses 167 include an inner surface defining the flange receiving portions 220 that provide mounting settings for a firearm buffer tube by receiving the buffer tube flange 142 of the firearm 120 (FIGS. 1-3). Flange 142 is also shown in, and discussed further, in connection with FIG. 6 below. In this example flange receiving portions 220 provide mounting settings that are approximately rectangular in shape with an open side, which functions to snuggly receive the buffer tube flange 142 when the buffer tube is inserted in a corresponding orientation (such as shown and described with reference to FIGS. 1-3 and 6). In alternative examples, the flange receiving portions have different shapes suitable to receive a correspondingly shaped buffer tube flange 142. For example, the flange receiving portions 220 can be rounded, triangular, trapezoidal, and so forth. In another alternative example, a single firearm assembly and adjustment mount 100 can include multiple flange receiving portions having two or more different shapes for mounting two or more different buffer tubes having correspondingly differently shaped flanges 142.

The buffer tube supports 222 are situated between each pair of flange receiving portions 220 and are configured to abut the cylindrical portion of the buffer tube of a firearm 120 (FIG. 1) to prevent upward/downward movement (along axis $A_2$ in FIG. 5), sideways movement (along axis $A_3$ in FIG. 5), and diagonal movement of the buffer tube when the firearm is mounted in the example firearm assembly and adjustment mount 100. The buffer tube supports 222 are contoured to correspond to the shape of the outer surface of the buffer tube 132. In the non-limiting example of FIG. 5, the buffer tube supports 222 are curved to correspond to the cylindrical shape of the exterior surface of the buffer tube 132. A relief recess 221 is positioned between each of the buffer tube supports 222 and each of the recesses 167.

As further shown in FIG. 5, in this example firearm assembly and adjustment mount 100, the firearm engagement portion 102 has an outer width $W_1$; the hollow body 106 has a width $W_2$ as measured between the outer edges of opposing flange receiving portions 220; each flange receiving portion 220 has a width $W_3$ and a height $H_1$ suitable for receiving correspondingly dimensioned buffer tube flanges; and support member 104 has a width $W_4$ and a height $H_2$ suitable for securing the support member 104 in a vise 145 or other support mechanism 144 as discussed in connection with FIG. 1. In example embodiments, $W_1$ is in a range from about 5.5 cm to about 7.0 cm; $W_2$ is in a range from about 4.0 cm to about 5.0 cm; $W_3$ is in a range from about 10 mm to about 15 mm; $W_4$ is in a range from about 12 mm to about 20 mm; $H_1$ is in a range from about 3 mm to about 10 mm; and $H_2$ is in a range from about 5.0 cm to about 6.0 cm. In one such example embodiment, $W_1$ is about 5.8 cm; $W_2$ is about 4.5 cm; $W_3$ is about 12.8 mm; $W_4$ is about 15 mm; $H_1$ is about 6.9 mm; and $H_2$ is about 5.0 cm. Other embodiments have other dimensions outside of these ranges.

Figure 6:
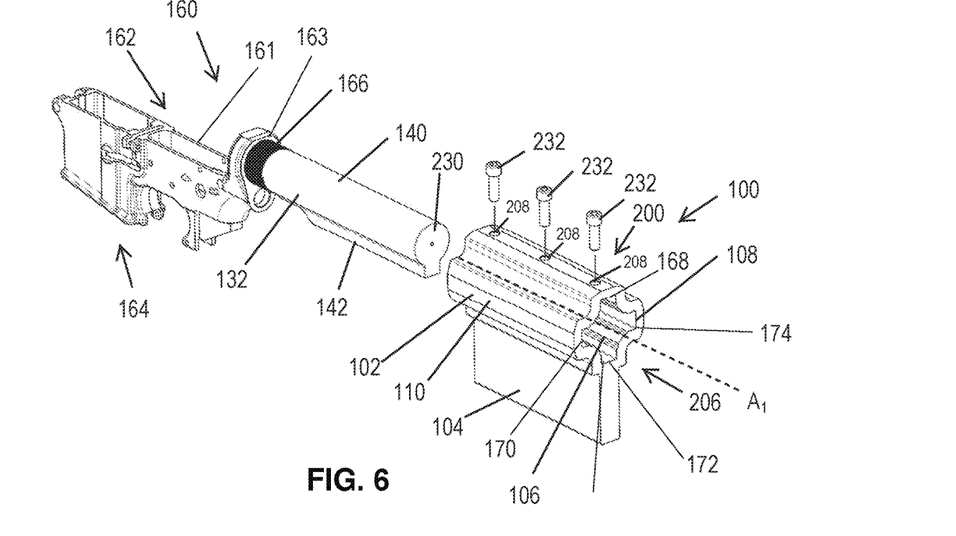
FIG. 6 illustrates a buffer tube and lower receiver portion of an example firearm prior to the buffer tube's insertion and securing in a firearm assembly and adjustment mount in accordance with the present disclosure.

FIG. 6 illustrates a buffer tube 132 and a lower receiver portion 160 of an example firearm prior to the buffer tube's insertion and securing in the firearm assembly and adjustment mount 100. As discussed above, the example firearm assembly and adjustment mount 100 includes the firearm engagement portion 102, the support member 104, and the hollow body 106 including the inner surface 108, the outer surface 110, and the multiple recesses 167, such as the recesses 168, 170, 172, and 174. The back 206 of the example firearm assembly and adjustment mount 100, along with through-holes 208 in the top 200 thereof, are also shown, as discussed above. FIG. 6 also illustrates the partially assembled lower receiver portion 160 of a firearm 120 (FIG. 1). The rear portion 161 of the lower receiver portion 160 includes the upper portion 162, the threaded portion 163, and the lower portion 164, as well as the buffer tube 132 with its cylindrical portion 140, flange 142, and screw threads 166 as discussed above. Additionally, in this example the buffer tube 132 includes a distal end 230, and the firearm assembly and adjustment mount 100 includes support screws 232.

In this example, in order to mount lower receiver portion 160 of the firearm 120, such as to perform maintenance, adjustment, and/or assembly on the firearm 120, the buffer tube 132 is inserted into the hollow body 106 of the firearm assembly and adjustment mount 100 such that the flange 142 is received by one of the flange receiving portions of the hollow body 106 as discussed above and secured in the respective recess 172. In one example, the buffer tube 132 is inserted until the distal end 230 of the buffer tube 132 is flush with the back 206 of the firearm assembly and adjustment mount 100, such as shown in FIG. 1. In alternative examples, the buffer tube 132 is inserted a greater or lesser distance into the hollow body 106, provided that the degree to which it is inserted is suitable for securing it in the mount and performing work on the firearm or portion thereof.

Once the buffer tube 132 is inserted into the hollow body 106 the desired distance, one or more fasteners are used to fasten the buffer tube 132 into the hollow body 106. In this example, the fasteners are one or more support screws 232. The support screws 232 include a threaded exterior that is sized and shaped to match a corresponding threaded interior of the one or more through-holes 208. Accordingly, one or more of the support screws 232 are screwed into the through-holes 208 until they make contact with, and apply pressure to, the buffer tube 132. In this manner one or more support screws 232 further secure buffer tube 132 in the hollow body 106 by preventing unwanted sliding of the buffer tube 132 along axis $A_1$ while work is being performed on the firearm 120 (FIG. 1) or portion thereof. In this example, the buffer tube 132 is inserted until its distal end 230 is flush with the back 206 of the firearm assembly and adjustment mount 100, at which point the one or more support screws 232 (e.g., three in this example) are screwed into the through-holes 208 to prevent longitudinal sliding movement of the buffer tube 132 along axis $A_1$. In alternative examples, zero, one, two or more than three screws are used. In further alternative examples, bolts or other types of pins are used instead of screws. Additionally, in some embodiments an interfacing member is arranged between the ends of the fasteners and the buffer tube. The interfacing member can be configured as a foot or pad at the end of the fastener, or as a long strip extending along the recesses 167, for example. The interfacing member can be formed of a cushioning material such as rubber and the like, to improve the grip of the fastener, and/or to protect the buffer tube 132 from scratching, or other damage by the fastener. In another possible embodiment the fasteners themselves are formed of a material that provides adequate grip and protects the buffer tube 132 from damage.

In some embodiments the firearm assembly and adjustment mount 100 is extruded from metal, e.g. aluminum, and the support screws 232 are molded from a rigid plastic to prevent damage to the buffer tube 132 when they apply pressure thereto. In alternative examples, other suitably strong materials may be used for the firearm assembly and adjustment mount 100, and materials of similarly suitable characteristics as rigid plastic may be used for the screws or pins.

Figure 7:
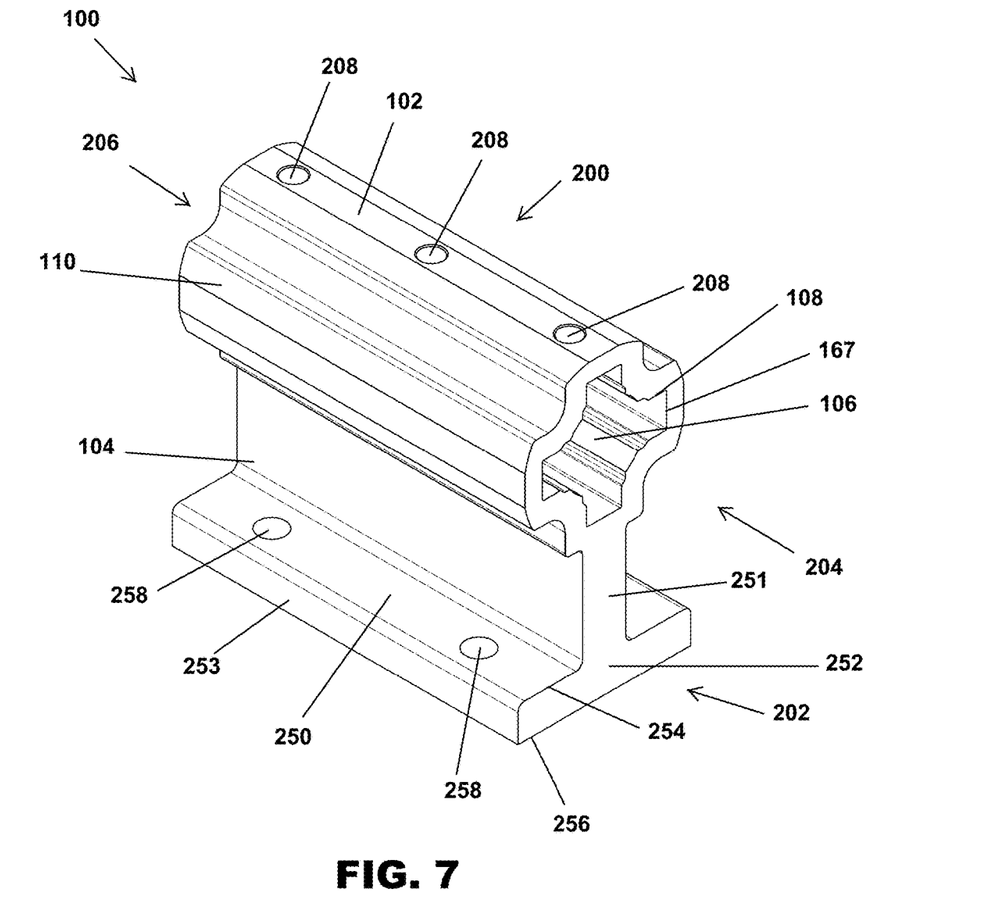
FIG. 7 is a perspective view of an alternative embodiment of a firearm assembly and adjustment mount in accordance with the present disclosure.

FIG. 7 is a perspective view of an alternative embodiment of a firearm assembly and adjustment mount 100. As discussed above, the example firearm assembly and adjustment mount 100 includes the firearm engagement portion 102, the support member 104, the hollow body 106 including the inner surface 108, the outer surface 110, and the recesses 167, as well as a top 200, a bottom 202, a front 204, a back 206, and through-holes 208. Additionally, in this example embodiment, the support member 104 includes a mounting portion 250. In some examples, the mounting portion 250 includes a stem 251 having a base 252, and a mounting plate 253 having a top 254, a bottom 256, and one or more through holes 258.

The mounting portion 250 of the support member 104 allows the firearm assembly and adjustment mount to be secured directly to a support, such as a work surface, without, e.g, first securing the support member to a vise 145 (FIG. 1) or a clamp. In some examples, the mounting portion 250 includes a stem 251 extending from the bottom of the firearm engagement portion 102, and a mounting plate 253 that extends outward perpendicularly from the base 252 of the stem 251. In some examples, the bottom 256 of the mounting plate 253 rests directly on a work surface. In some examples, one or more through holes 258 extending from the top 254 to the bottom 256 of the mounting plate 253 are configured to receive bolts, pins, screws, nails, or other fasteners that affix the mounting plate 253 to the work surface. The work surface can alternatively have a horizontal orientation, a vertical orientation, or an orientation having both horizontal and vertical components. Thus, the firearm assembly and adjustment mount 100 can be mounted to a work surface in a variety of different orientations relative to the ground.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A mount for a firearm assembly and adjustment, the firearm assembly including a buffer tube having a cylindrical portion and a buffer tube flange, the mount comprising:
    a firearm engagement portion comprising a hollow body defining a central, longitudinal axis and comprising at least one recess extending away from the longitudinal axis, wherein the hollow body comprises an inner surface, the inner surface comprising at least one buffer tube support being sized and shaped to receive the cylindrical portion of the buffer tube, the at least one recess forming a buffer tube flange receiving portion that provides a mounting setting for the firearm buffer tube, the at least one recess being sized and shaped to receive the buffer tube flange, wherein the hollow body comprises at least one through-hole for inserting a fastener, the at least one through-hole passing through an outer surface and the inner surface of the hollow body; and
    a support member, the support member extending from the firearm engagement portion and configured to be secured to a support, the support member having a monolithic construction and a generally rectangular cross-section, the support member having a width and a length, the length extending radially away from the longitudinal axis of the hollow body, wherein the length is greater than the width.

2. The mount of claim 1, wherein the support member includes a mounting portion having a stem and a base, wherein the base includes one or more through holes configured to receive one or more fasteners therethrough to connect the support member to a work surface.

3. The mount of claim 1, wherein the support member is configured to be secured in a support mechanism.

4. The mount of claim 3, wherein the support mechanism is a vise, wherein the support member is configured to be secured within jaws of the vise.

5. The mount of claim 1, wherein the hollow body comprises at least two recesses.

6. The mount of claim 1, wherein the hollow body comprises four recesses.

7. The mount of claim 6, wherein adjacent recesses of the four recesses are perpendicular to each other.

8. The mount of claim 1, wherein the at least one recess includes two opposing sides and a side interconnecting the two opposing sides, wherein the side interconnecting the two opposing sides forms discretely identifiable corners with the two opposing sides, the at least one recess also including an open side that faces inwardly toward the longitudinal axis, the inner surface further including a relief recess positioned between the buffer tube support and at least one of the two opposing side walls of the at least one recess.

9. The mount of claim 1, wherein the inner surface of the hollow body is longer axially than it is radially.

10. A mount for a firearm assembly and adjustment comprising:
    a firearm engagement portion comprising a hollow body defining a central, longitudinal axis and comprising a plurality of recesses such that each of the plurality of recesses extends in a distinct direction away from the longitudinal axis, the plurality of recesses being sized and shaped to receive a buffer tube flange of a buffer tube of a firearm, wherein the hollow body comprises an inner surface, the inner surface comprising a buffer tube support between the plurality of recesses, the buffer tube support being sized and shaped to receive a cylindrical portion of the buffer tube, wherein the hollow body extends axially along a length between a front face and a back face, wherein a width of at least one of the front face and the back face is less than the length of the hollow body; and
    a support member, the support member extending from the firearm engagement portion and configured to be secured to a support, the support member having a monolithic construction and a generally rectangular cross-section, the support member having a width and a length, the length extending radially away from the longitudinal axis of the hollow body, wherein the length is greater than the width.

11. The mount of claim 10, wherein each of the plurality of recesses comprises a buffer tube flange receiving portion that provides a distinct mounting setting for the firearm buffer tube.

12. The mount of claim 10, wherein the hollow body comprises at least three recesses.

13. The mount of claim 10, wherein the hollow body comprises four recesses.

14. The mount of claim 13, wherein adjacent recesses of the four recesses are perpendicular to each other.

15. The mount of claim 10, wherein the body portion of the firearm engagement portion comprises at least one through-hole for inserting a fastener, the at least one through-hole passing through an outer surface and the inner surface of the hollow body.

16. The mount of claim 15, wherein the at least one through-hole is configured to receive a support pin therethrough.

17. The mount of claim 15, wherein the at least one through-hole is configured to receive a support screw therethrough.

18. The mount of claim 10, wherein the body portion comprises an outer surface, the outer surface comprising a plurality of recesses corresponding to the plurality of recesses of the hollow body.

19. The mount of claim 10, wherein at least two recesses from among the plurality of recesses are perpendicular to each other.

20. A mount for a firearm assembly and adjustment comprising:
   a firearm engagement portion comprising a hollow body extending axially along a length between a front face and a back face, wherein a width of at least one of the front face and the back face is less than the length of the hollow body, the hollow body comprising an outer surface, an inner surface, and at least one through-hole passing through the outer surface and the inner surface for inserting a fastener therethrough, the hollow body defined by a central, longitudinal axis and comprising four recesses such that each of the four recesses extends in a distinct direction away from the central, longitudinal axis and provides a distinct mounting setting for a firearm buffer tube of a firearm, the four recesses being sized and shaped to receive a buffer tube flange of the firearm buffer tube, the inner surface of the hollow body including a buffer tube support between each adjacent pair of the four recesses, the buffer tube supports being sized and shaped to receive a cylindrical portion of the buffer tube, wherein adjacent recesses of the four recesses are perpendicular to each other; and
   a support member having a monolithic construction and a generally rectangular cross-section, the support member having a width and a length, the length extending radially away from the longitudinal axis of the hollow body, wherein the length is greater than the width, the support member comprising a plurality of support engaging surfaces extending from the bottom of the firearm engagement portion and configured to be secured in a vise.

* * * * *